(12) United States Patent
Na

(10) Patent No.: US 10,380,170 B2
(45) Date of Patent: Aug. 13, 2019

(54) INTEGRATED IMAGE SEARCHING SYSTEM AND SERVICE METHOD THEREOF

(71) Applicant: SK PLANET CO., LTD., Seongnam-si, Gyeonggi-do (KR)

(72) Inventor: Seung Won Na, Seoul (KR)

(73) Assignee: SK PLANET CO., LTD., Seoul (KR)

(*) Notice: Subject to any disclaimer, the term of this patent is extended or adjusted under 35 U.S.C. 154(b) by 0 days.

(21) Appl. No.: 15/345,567

(22) Filed: Nov. 8, 2016

(65) Prior Publication Data

US 2017/0075885 A1 Mar. 16, 2017

Related U.S. Application Data

(63) Continuation of application No. 13/814,970, filed as application No. PCT/KR2011/005209 on Jul. 15, 2011, now Pat. No. 9,576,195.

(30) Foreign Application Priority Data

Aug. 9, 2010 (KR) .................. 10-2010-0076588
Oct. 15, 2010 (KR) .................. 10-2010-0100677

(51) Int. Cl.
*G06K 9/62* (2006.01)
*G06F 16/438* (2019.01)
(Continued)

(52) U.S. Cl.
CPC .......... *G06F 16/438* (2019.01); *G06F 16/434* (2019.01); *G06K 9/00456* (2013.01);
(Continued)

(58) Field of Classification Search
None
See application file for complete search history.

(56) References Cited

U.S. PATENT DOCUMENTS

2009/0154778 A1  6/2009 Lei et al.
2010/0291921 A1  11/2010 Ruuska et al.

FOREIGN PATENT DOCUMENTS

KR        10-0633231 B1     10/2006
KR     10-2006-0122791 A    11/2006
(Continued)

OTHER PUBLICATIONS

Alan De Smet, Machine Readable Passport Zone, www.highprogrammer.com, web archive date 2008.*
(Continued)

*Primary Examiner* — Mark Roz
(74) *Attorney, Agent, or Firm* — Brinks Gilson & Lione

(57) ABSTRACT

The present disclosure relates to an image searching system and method for searching by using images of objects. Images of objects which it is desired to search are input via a PC-based terminal equipped with a webcam or a smart phone and then the input object images are analyzed using image recognition technology based on feature point extraction such that types of code contained in the object images are categorized and a decoder matching the object type is automatically driven such that the object is read, and thus a search function is provided which allows integrated recognition of all objects regardless of the type of object and which is convenient for the user.

6 Claims, 6 Drawing Sheets

(51) Int. Cl.
*G06F 16/432* (2019.01)
*G06K 9/00* (2006.01)
(52) U.S. Cl.
CPC ..... *G06K 9/00523* (2013.01); *G06K 9/00671* (2013.01); *G06K 9/628* (2013.01)

(56) References Cited

FOREIGN PATENT DOCUMENTS

| | | |
|---|---|---|
| KR | 10-0669511 A | 1/2007 |
| KR | 10-2008-0079443 A | 9/2008 |
| KR | 10-2009-0093904 A | 9/2009 |

OTHER PUBLICATIONS

Alan De Smet, Machine Readable Passport MRZ Calculator, www.highprogrammer.com, web archive date 2008.*

Brazdil P.B., Soares C. (2000) A Comparison of Ranking Methods for Classification Algorithm Selection. In: López de Mántaras R., Plaza E. (eds) Machine Learning: ECML 2000. ECML 2000. Lecture Notes in Computer Science (Lecture Notes in Artificial Intelligence), vol. 1810. Springer, Berlin, Heidelberg).*

International Search Report dated Jan. 6, 2012 for PCT/KR2011/005209.

Dave Marshall, "Remote Procedure Calls", from www.cs.cf.ac.uk/Dave/node22.html, Jan. 1999.

Margaret Rouse, "Remote Procedure Call (RPC) definition", WhatIs.com, Jan. 2009.

* cited by examiner

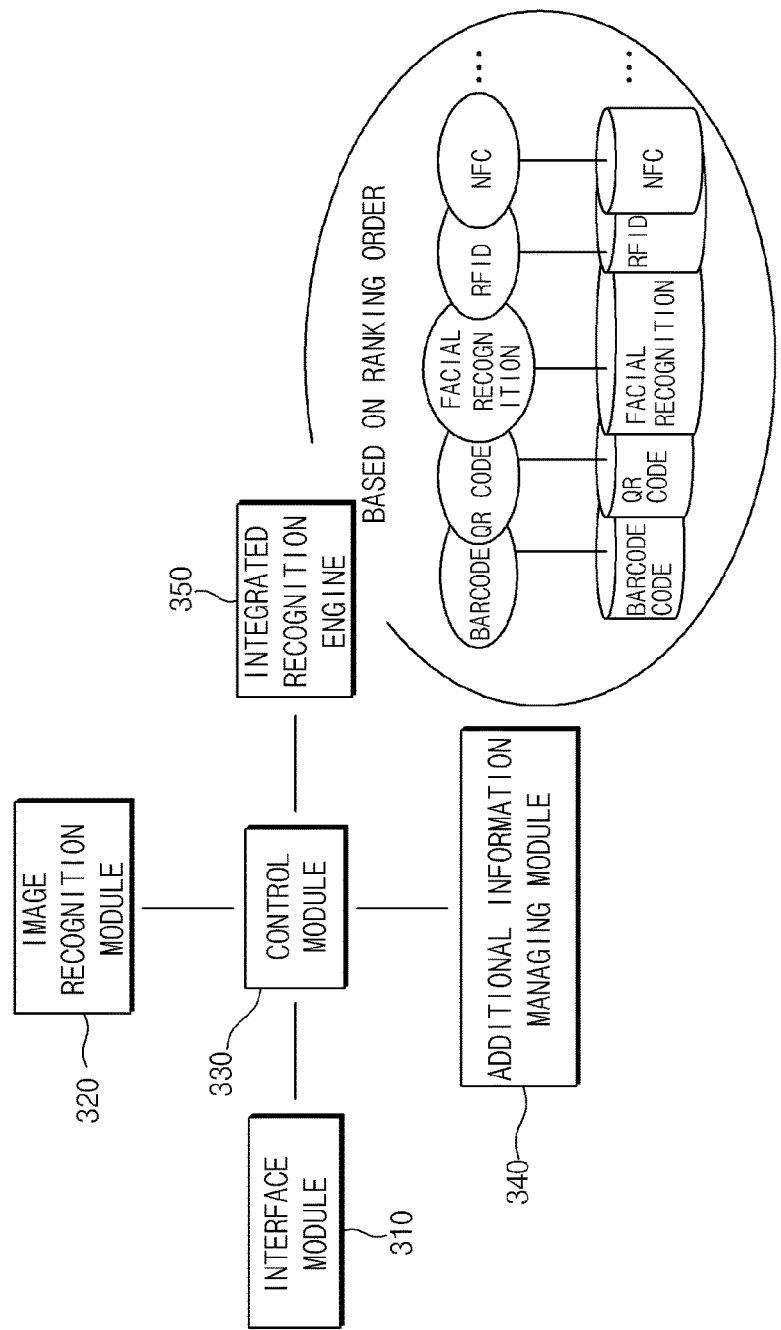

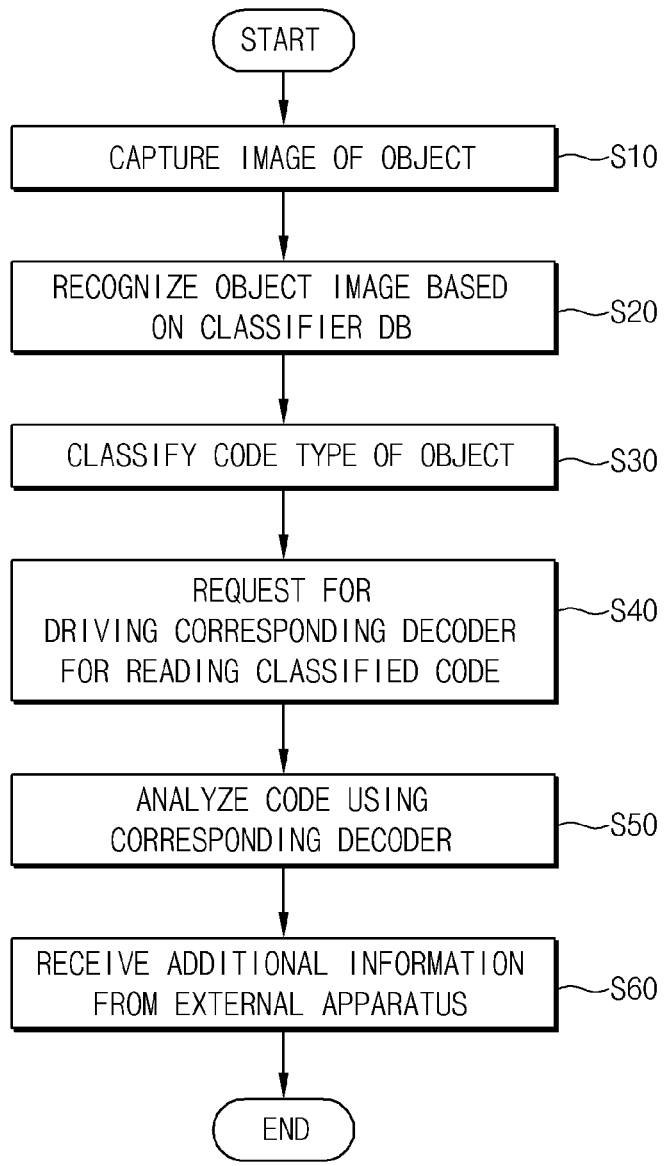

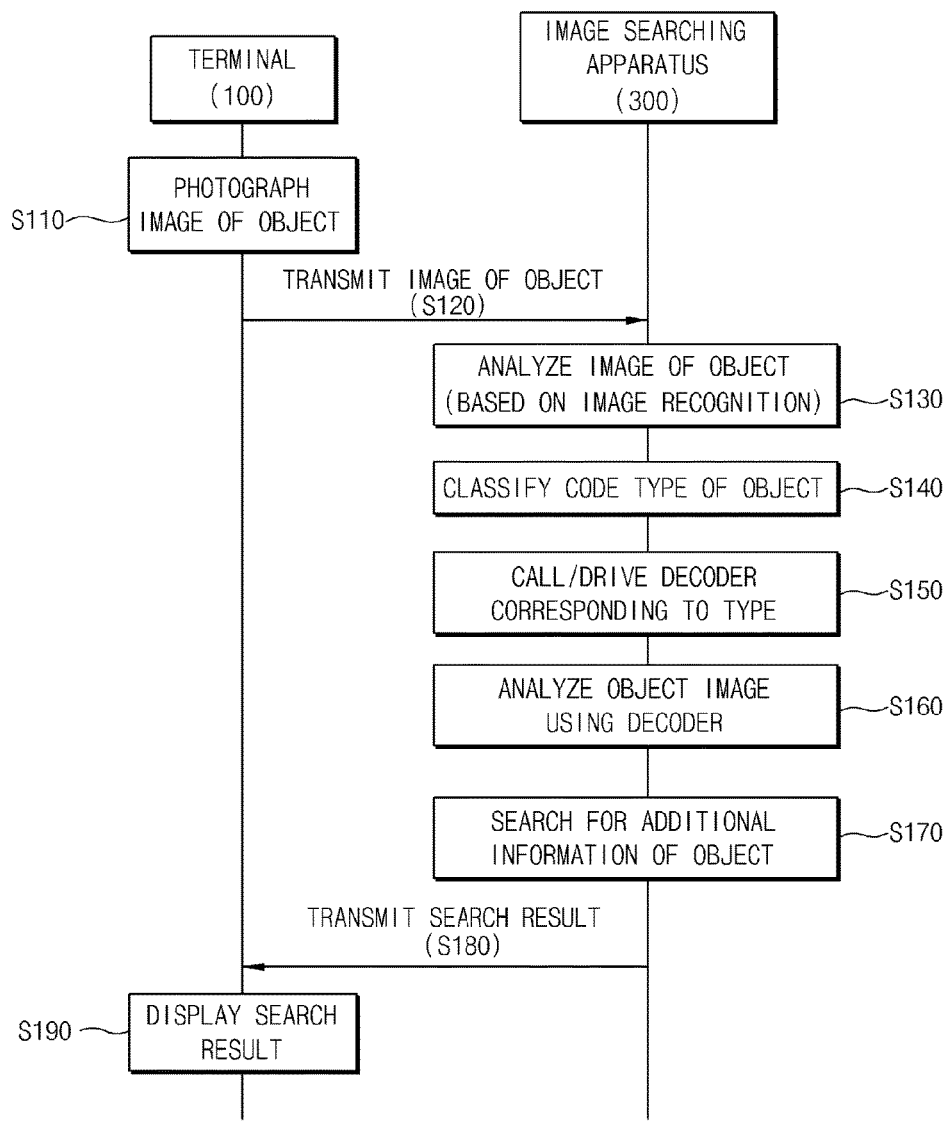

INTEGRATED IMAGE SEARCHING SYSTEM AND SERVICE METHOD THEREOF

CROSS-REFERENCE TO RELATED APPLICATION

This present application is a Continuation of the U.S. patent application Ser. No. 13/814,970 filed on Feb. 8, 2013 and a National Stage filing under 35 U.S.C § 371 of PCT application number PCT/KR2011/005209 filed on Jul. 15, 2011 which is based upon and claims the benefit of priority to Korean patent Application Nos. 10-2010-0076588 filed on Aug. 9, 2010 and 10-2010-0100677 filed on Oct. 15, 2010 in the Korean Intellectual Property Office. The disclosures of the above-listed applications are hereby incorporated by reference herein in their entirety.

TECHNICAL FIELD

The present disclosure relates to an integrated image searching system and a service method thereof, and more particularly, to an integrated image searching system that, when an image of an object desired to be searched through a smart phone or a personal computer (PC)-based terminal equipped with a webcam is input, analyzes an input image using image recognition technology based on feature point extraction, verifies a code type of the object, automatically drives a corresponding decoder based on the type of the object, and decodes the object, thereby enabling integrated recognition with respect to all of the objects regardless of the object type, and a service method thereof.

BACKGROUND ART

In general, when viewing a movie or an advertisement program on a television (TV) and the like, when finding an object (for example, a person or a thing) that a user favors while shopping, or when finding a predetermined object that a user is usually interested in, users desire to memorize the object by taking a memo of the object or currently by capturing the object using a camera of a mobile terminal.

However, in the first case, management is not easy in that a user needs to make a habit of taking a memo, and to carry a memo pad at all times, and also may lose a memo pad in which detailed information of a product is written.

In the second case, portability and management is easy in that a user uses a mobile terminal that the user carries all the time. However, there is a disadvantage in that the user needs to manually input information exposed in an image in order to search for a desired object using the captured image. For example, the user needs to input a name or a product number of a product exposed in the image, a shape, a color, and the like.

Here, with respect to clearly exposed information such as the name or the product number of the product, a search may be clearly performed. However, when there is a characteristic in the shape, the image, and the like, or when accurate information is unknown even after viewing the image, it is difficult to perform a search.

Accordingly, currently, technologies embedded with a decoder (a recognition engine) capable of performing recognition using an image of an object have been applied to a terminal.

That is, disclosed is technology of recognizing a barcode from a barcode image by equipping a terminal with a barcode decoder, or recognizing a quick response (QR) code from an image of the QR code using a terminal embedded with a QR code decoder.

However, in the above technologies, decoders for a barcode, a QR code, facial recognition, and image recognition are individually equipped in each terminal and thus, recognition is limited according to a type of an object. Also, to recognize an object, there is disadvantage in that a user needs to directly execute a decoder according to the type of the object.

DISCLOSURE

Technical Problem

The present disclosure has been made in an effort to solve the problems, and an object of the present disclosure is to provide a system and a method in which when an object image with respect to a recognition target desired to be searched is input, a terminal or a server verifies a type of an object from the image using image recognition technology based on feature point extraction, automatically calls a decoder corresponding to the verified object type, and decodes the corresponding object, thereby enabling integrated recognition with respect to all of the objects regardless of a code type thereof.

Also, another object of the present disclosure is to provide a system and a method that may perform an efficient search process by, when a plurality of objects is included in an image of a recognition target desired to be searched, recommending a single object having the highest recognition rate among the plurality objects, decoding the object using a decoder corresponding to a recommended object type and then showing the search result, or by recommending the plurality of objects in a descending order of a recognition rate, sorting the search result in a recommendation order, and thereby showing the search result.

Technical Solution

According to a first aspect of the present disclosure, there is provided an integrated image searching system including: an image searching apparatus to provide additional information associated with each object; and a terminal to access the image searching apparatus over a communication network, to make a request for searching for additional information about a desired object, to receive a search result, to capture the desired object using a photographing device in the search request, to analyze a captured object image based on image recognition, to classify a type of the object, to automatically drive a decoder corresponding to the type of the object, to decode the object, and to transmit decoded object information to the image search apparatus.

According to a second aspect of the present disclosure, there is provided an integrated image searching system including: a terminal to transmit an object image obtained by capturing a desired object, to make a request for searching for additional information associated with the object, and to receive a search result; and an image searching apparatus to analyze the object image based on image recognition when the object image is received from the terminal, to classify a type of the object, to automatically drive a decoder corresponding to the type of the object, to decode the object, and to provide, to the terminal, additional information that is retrieved based on decoded object information.

The integrated image searching system further comprises an additional service apparatus to store and manage additional information associated with the object, and to provide pre-stored additional information to the image searching apparatus in response to a search request of the image searching apparatus.

According to a third aspect of the present disclosure, there is provided a terminal including: a photographing device to create a code image of an object by capturing a desired object or a code attached to the object; an image recognition unit to classify a code type of the object by analyzing the code image of the object created using the photographing device, based on image recognition; an integrated recognition engine to decode the object image by automatically driving a decoder corresponding to the type of the object classified using the image recognizing unit; and an interface unit to transmit code information decoded using the integrated recognition engine to an external apparatus connected over a communication network, to make a request for searching for additional information about the code information, and to receive the search result.

The integrated recognition engine includes a plurality of decoders decodable according to the type of the object.

When the number of types of objects classified using the image recognition unit is plural, the integrated recognition engine searches for decoder information having a recognition rate ranking with respect to the decoder, and sequentially drives a decoder starting with a decoder having a relatively high ranking recognition rate among decoders corresponding to the type of the object and provides the search result in a descending order of the recognition rate.

When the number of types of objects classified using the image recognition unit is plural, the integrated recognition engine searches for decoder information having a recognition rate ranking with respect to the decoder, and drives and decodes only a decoder having the highest recognition rate among decoders corresponding to the type of the object.

The image recognition unit extracts a feature point from the object image based on image recognition, and classifies the type of the object based on the extracted feature point.

The plurality of decoders includes all of a barcode decoder, a quick response (QR) code decoder, a near field communication (NFC) decoder, a radio frequency identification (RFID) decoder, an optical character recognition (OCR) decoder, a facial recognition decoder, and an image recognition decoder.

According to a fourth aspect of the present disclosure, there is provided an image searching apparatus including: an image recognition module to classify a type of an object by analyzing an image of the object based on image recognition when the image of the object obtained by capturing the object desired to be searched is input; an integrated recognition engine to decode the image of the object by automatically driving a decoder according to the type of the object classified by the image recognition module, and to make a request for searching for additional information about the object based on decoded object information; and an interface module to receive the image of the object from a terminal of a client, to transfer a received image of the object to the image recognition module, and to provide, to the terminal, additional information that is retrieved with respect to information read using the integrated recognition engine.

When the number of types of objects classified using the image recognition unit is plural, the integrated recognition engine by searching for decoder information having a recognition rate ranking with respect to the decoder, and sequentially drives a decoder starting with a decoder having a relatively high ranking recognition rate among decoders corresponding to the type of the object and provides the search result in a descending order of the recognition rate.

When the number of types of objects classified using the image recognition unit is plural, the integrated recognition engine searches for decoder information having a recognition rate ranking with respect to the decoder, and drives and decodes only a decoder having the highest recognition rate among decoders corresponding to the type of the object.

The image recognition module extracts a feature point from the image of the object based on image recognition, and classifies the type of the object based on the extracted feature point.

The image recognition module includes all of a barcode decoder, a QR code decoder, an NFC decoder, an RFID decoder, an OCR decoder, a facial recognition decoder, and an image recognition decoder based on a code type of the object.

According to a fifth aspect of the present disclosure, there is provided a search service method of a terminal, the method including: creating an image of an object by capturing a desired object; classifying a type of the object by analyzing the image of the object based on image recognition; making a request for driving by automatically calling a decoder according to the type of the object; identifying the object by decoding the image of the object using the decoder requested to be driven; and transmitting object information decoded by the decoder to an external apparatus connected with a communication network, making a request for searching for the additional information about object information, and receiving a search result.

The number of types of objects is plural, wherein in the automatically calling of the decoder according to the type of the object searches for decoder information having a recognition rate ranking with respect to the decoder, and sequentially performs automatic calling starting with a decoder having a relatively high ranking recognition rate among decoders corresponding to a code type of the object.

When the number of types of objects is plural, wherein in the automatically calling of the decoder according to the type of the object searches for decoder information having a recognition rate ranking with respect to the decoder, and drives and decodes only a decoder having the highest recognition rate among decoders corresponding to the type of the object.

In the classifying of the type of the object extracts a feature point from the image of the object based on image recognition, and classifies the type of the object by comparing the extracted feature point with pre-stored feature point information. The plurality of decoders is provided according to the type of the object.

The decoder includes a barcode decoder, a QR code decoder, an NFC decoder, an RFID decoder, an OCR decoder, a facial recognition decoder, and an image recognition decoder.

According to a sixth aspect of the present disclosure, there is provided a search service method of an image searching apparatus, the method including: receiving, from a terminal of a client, an image of an object obtained by capturing the object desired to be searched; classifying a type of the object by analyzing the image of the object based on image recognition; making a request for driving by automatically calling a decoder according to the type of the object; identifying the object by decoding the image of the object using the decoder requested to be driven; and searching for additional information about the object based on object information decoded by the decoder, and transmitting a search result to the terminal.

The number of types of objects is plural, wherein in the automatically calling of the decoder according to the type of the object searches for decoder information having a recognition rate ranking with respect to the decoder, and sequentially performs automatic calling starting with a decoder having a relatively high ranking recognition rate among decoders corresponding to a code type of the object.

The number of types of objects is plural, wherein in the automatically calling of the decoder according to the type of the object searches for decoder information having a recognition rate ranking with respect to the decoder, and drives and decodes only a decoder having the highest recognition rate among decoders corresponding to the type of the object.

In the classifying of the type of the object extracts a feature point from the image of the object based on image recognition, and classifies the type of the object by comparing the extracted feature point with pre-stored feature point information.

A plurality of decoders is provided to be plural according to the type of the object.

The decoder includes a barcode decoder, a QR code decoder, an NFC decoder, an RFID decoder, an OCR decoder, a facial recognition decoder, and an image recognition decoder.

Advantageous Effects

According to the present disclosure, even though various types of objects such as a barcode, a facial image, a quick response (QR) code, a near field communication (NFC) tag, a radio frequency identification (RFID) tag, and the like, are input, automatic recognition is enabled without a need for a user to directly select and manipulate a search scheme for each object type by automatically recognizing a corresponding type through image recognition of an object and by selecting and applying a decoder based on the recognized type. Also, integrated recognition with respect to a variety of objects is enabled in a single terminal or server and thus, a convenient search service may be provided.

Also, when a plurality of objects is included in an image obtained by capturing a recognition target, an efficient search process is induced to be performed by recommending a single object having the highest recognition rate among the plurality of objects in object recognition, or by sorting and thereby recommending the plurality of objects in a descending order of a recognition rate.

Also, even a device that is not equipped with an integrated decoder for search may provide a service using an external server based integrated recognition engine. Therefore, regardless of the device, it is possible to provide an image recognition and search service with respect to an object. Further, even though a type of an object is newly added, a corresponding decoder may be easily expanded and thus, service expansion is enabled.

Also, by associating the present disclosure with a price comparison service or a shopping providing service using an online shopping mall as an additional service, it is possible to induce purchase of a product and thereby make profits.

DESCRIPTION OF DRAWINGS

FIG. 4 is a block diagram illustrating a configuration of an image searching apparatus according to an exemplary embodiment of the present disclosure.

FIG. 5 is a flowchart illustrating a search process of a terminal when an integrated recognition engine according to an exemplary embodiment of the present disclosure is equipped in the terminal.

FIG. 6 is a flowchart illustrating a search process between an image searching apparatus and a terminal when an integrated recognition engine according to an exemplary embodiment of the present disclosure is equipped in the image searching apparatus connected to a communication network.

Figure 1:
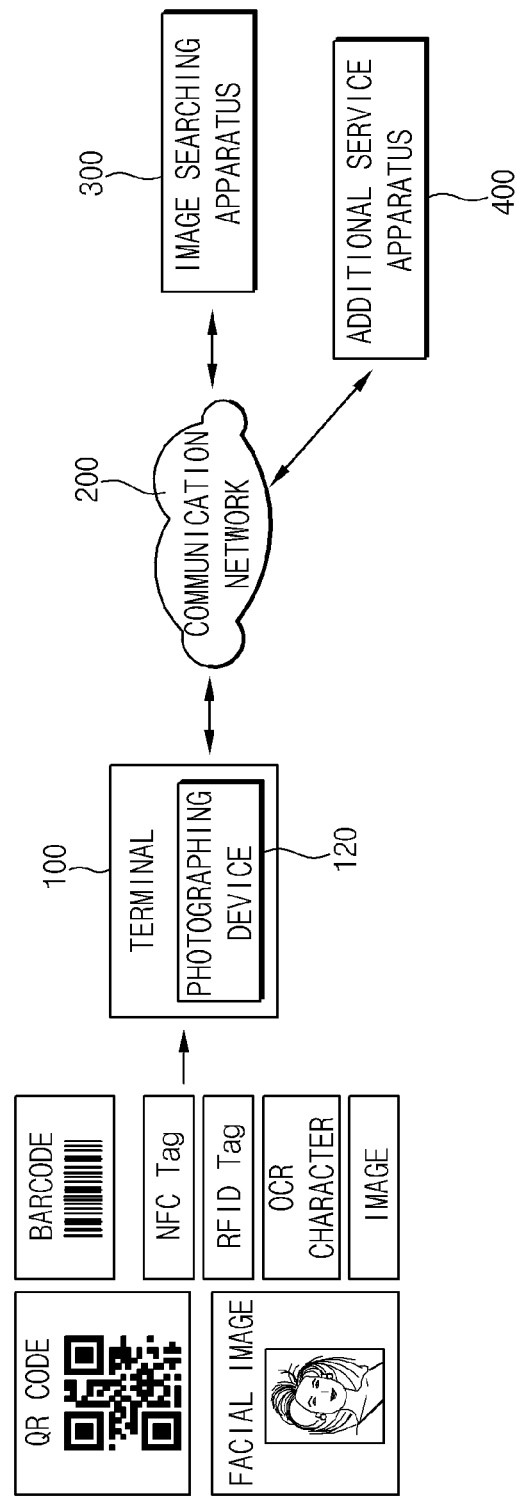
FIG. 1 is a diagram illustrating a network configuration of an integrated image searching system according to an exemplary embodiment of the present disclosure.

[Description of Main Reference Numerals of Drawings]

| | |
|---|---|
| 100: Terminal | 200: Communication network |
| 300: Image searching apparatus | 400: Additional service apparatus |
| 110: Interface unit | 120: Photographing device |
| 130: Control unit | 140: Image recognition unit |
| 150: Memory | 160: Integrated recognition engine |
| 162: Classifier DB | 164: Decoder |
| 310: Interface module | 320: Image recognition module |
| 330: Control module | 340: Additional information |
| 350: Integrated recognition engine. | managing module |

BEST MODE

Hereinafter, exemplary embodiments of the present disclosure will be described in detail with reference to the accompanying drawings. The structure of the present disclosure and the effects derived therefrom will be clearly understood through the detailed description below. Before providing the detailed description of the present disclosure, it should be noted that the same components are identified by the same reference numerals whenever possible even in different drawings, and when it is determined that detailed description relating to well-known functions or configurations may make the subject matter of the present disclosure unnecessarily ambiguous, the detailed description will be omitted.

An object described in the following description indicates all of the input values that are a target of recognition. That is, with respect to a product that a user desires to purchase while shopping or has found by chance, the object may include a product image and an identification (ID) code of the product. Also, the object may include an image of a person or a thing exposed through a program excluding the product, a predetermined body portion, and the like. The ID code of the product may include a product number including characters/numbers and the like, a barcode, a quick response (QR) code, a near field communication (NFC) tag, a radio frequency identification (RFID) tag, an optical character recognition (OCR) code, a color code, a trademark marker, and the like.

As described above, the object includes a code or a product image attached or printed on the product and thus, may be obtained by photographing the object. However, the object is not limited thereto and may be obtained using the Internet or other media. For example, a code published on the Internet, newspaper, and the like may be obtained through photographing.

Every object has a feature point in an aspect of a character, a shape, a usage, and a function. In an image obtained by photographing an object, at least two feature points may be present. For example, when an ID code is attached to glasses, a recognition target is glasses and an image obtained by photographing the recognition target includes ID code information as well as image information about the glasses. In this case, the object is at least one of an image and an ID code with respect to the glasses, and a type of the object follows the image or a code type.

By referring thereto, a configuration of an integrated image search of the present disclosure will be described.

FIG. 1 is a diagram illustrating a network configuration of an integrated image searching system according to an exemplary embodiment of the present disclosure.

The image searching system according to an exemplary embodiment of the present disclosure may include a terminal 100 to receive an image of an object desired to be searched, and an image searching apparatus 300 to recognize and search for the image of the object received from the terminal 100 over a communication network 200.

Additionally, the integrated image searching system may further include an additional service apparatus 400 to provide additional information about each object to the image searching apparatus 300 or the terminal 100.

Here, when the object is a thing, the additional information may include detail information about the thing, shopping purchase information (price information, selling place information, and the like), price comparison information, and the like. Also, when the object is a person, the additional information may include detail information (for example, clothes that the person is wearing, accessory information, music album information, and the like) associated with the person.

When the terminal 100 is a terminal capable of transmitting and receiving data over the communication network 200 and obtaining an image of an object, the terminal 100 may be applied regardless of a type of the terminal 100. For example, a personal computer (PC), a personal digital assistant (PDA), a digital camera, a webcam, a mobile terminal, and the like may be applied.

In particular, the terminal 100 according to an exemplary embodiment of the present disclosure creates and stores an image of an object by capturing the object that is found while shopping or usually found by chance. When a user desires to manage detail information about the object and manage the object, the terminal 100 transmits a code image of the captured image to the image searching apparatus 300 over the communication network 200. For the above operation, the terminal 100 may include a photographing device 120 to capture (photograph) the object and create an image of the object.

Also, the terminal 100 according to an exemplary embodiment of the present disclosure may classify a type of an object by analyzing a data type, a color, a predetermined pattern, and the like with respect to an object image obtained from the photographing device 120, and may select and apply a decoder based on the classified type, thereby enabling integrated recognition with respect to a variety of objects. For the above operation, the terminal 100 may include an integrated recognition engine to perform the above function. A detailed description thereof will be described in detail later.

Also, the terminal 100 according to an exemplary embodiment of the present disclosure may receive at least one of position information about a position at which an object is captured, date information that is information about a date, that is, a time when a product of interest is captured, and other information including additional information about a selling price or a selling place about the object, and the like, and may attach and thereby include the received information in an image of the object.

Also, instead of receiving, from a user, position information about a position at which an object is captured, when the object is captured, the terminal 100 according to an exemplary embodiment of the present disclosure may autonomously verify a position at which a product of interest is captured, and may add position information to a code image of the object by including a global positioning system (GPS).

Also, the terminal 100 according to an exemplary embodiment of the present disclosure may access the additional service apparatus 400 using a data communication service or an Internet service provided from the communication network 200, and may receive a shopping service about the object from the additional service apparatus 400. In this case, the terminal 100 may receive access information accessible to the additional service apparatus 400 from the image searching apparatus 300, and may directly access the additional service apparatus 400 using the access information.

The communication network 200 is a network that provides a service through wired/wireless communication with the terminal 100. That is, the communication network 200 may be a wired Internet network, and may include a wireless data network (an Internet network, an IP Multimedia Subsystem (IMS), and the like) connected through a mobile communication network (code division multiple access (CDMA), wideband code division multiple access (W-CDMA), and the like), a satellite communication network, an Internet network connected through wireless fidelity (Wi-Fi), and the like. Specifically, in the case of a CDMA network, the terminal 100 may access a data network through a packet data serving node (PDSN). In the case of a W-CDMA network, the terminal 100 may access the data network through a gateway GPRS support node (GGSN). Also, in a region such as a hot spot and the like, the terminal 100 may access the Internet network through NFC such as Wi-Fi and the like.

When a request for transmitting an image of an object is received from the terminal 100, the communication network 200 according to an exemplary embodiment of the present disclosure transmits, to the image searching apparatus 300, an object image that is received from the terminal 100. On the contrary, the communication network 200 receives, from the image searching apparatus 300, a request for transmitting search result information, and transmits the search request information to the corresponding terminal 100.

The image searching apparatus 300 provides an object recognition and search function in response to a request of the terminal 100. That is, the image searching apparatus 300 receives additional information about each of objects from the additional service apparatus 400, and stores and updates the additional information in a database. When a request for searching for an object is received from the terminal 100, the image searching apparatus 300 searches for additional information of the corresponding object and transmits the search result to the terminal 100.

In the case of a system in which integrated recognition is enabled in the terminal 100, when a request for searching for an object is received from the terminal 100, the image searching apparatus 300 may perform a function of searching for additional information using object information decoded in the terminal 100, and feeding back the search result to the terminal 100.

Alternatively, in the case of a system in which integrated recognition is enabled in the image searching apparatus 300, the image searching apparatus 300 may additionally perform a function of receiving an image of the object from the terminal 100, analyzing a data type, a color, a predetermined pattern, and the like with respect to a code image, classifying a type of the object, and decoding a code using an optimal decoder based on the classified type. Next, the image searching apparatus 300 searches for additional information of the corresponding object and transmits the search result to the terminal 100. A detailed configuration thereof will be described in detail with reference to FIG. 4.

The additional service apparatus 400 may store and manage additional information associated with a variety of objects and code information, and may provide and thereby update additional information associated with an object to the image searching apparatus 300 at predetermined intervals.

Also, the additional service apparatus 400 according to an exemplary embodiment of the present disclosure manages an online shopping mall site at which an object is sold. In this case, the additional service apparatus 400 sells and delivers a purchase product in response to a purchase request of the terminal 100.

An integrated image searching system according to the above configuration enables the terminal 100 or the image searching apparatus 300 to automatically recognize a type of an object through image recognition and to select and apply a decoder based on the recognized type even though various types of objects such as a barcode, a QR code, an NFC tag, an RFID tag, an image (facial image), and the like are input. Therefore, without a need for a user to directly select and manipulate a recognition scheme based on an object type, an automatic recognition is enabled. Also, integrated recognition with respect to a variety of objects is enabled in a single terminal or server and thus, a convenient search service may be provided.

Figure 2:
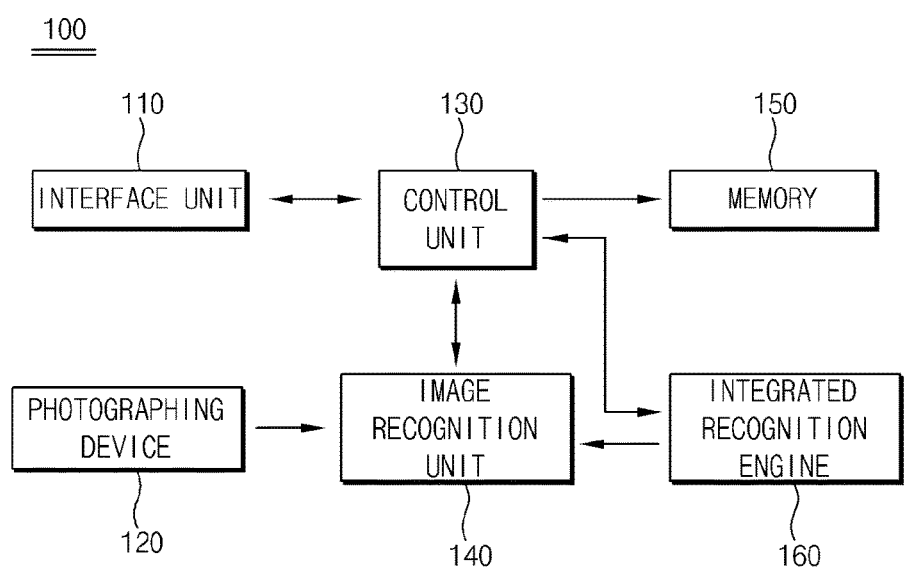
FIG. 2 is a block diagram illustrating a configuration of a terminal according to an exemplary embodiment of the present disclosure.

FIG. 2 is a block diagram illustrating a configuration of a terminal according to an exemplary embodiment of the present disclosure.

Referring to FIG. 2, the terminal 100 performs an integrated recognition function by including an integrated recognition engine to automatically recognize and thereby decode an image of an object.

The terminal 100 includes an interface unit 110, the photographing device 120, a control unit 130, an image recognition unit 140, a memory 150, and an integrated recognition engine 160.

The interface unit 110 accesses the image searching apparatus 300 of FIG. 1 or the additional service apparatus 400 of FIG. 1 over the communication network 200 of FIG. 1 and interfaces communication therewith.

The photographing device 120 creates an image of an object by capturing the object. Specifically, the photographing device 120 may include a camera, a webcam, and the like that are provided in the terminal 100.

The memory 150 may store an object image captured using the photographing device 120, and may store information recognized using the image recognition unit 140 and the integrated recognition engine 160.

The image recognition unit 140 analyzes a data type, a color, a feature pattern (a shape, a pattern, and a position value of a feature point), and the like of the object by applying, to the object image created using the photographing device 120, an image recognition method based on feature point extraction, and classifies a type of the object through the analysis. The object includes an image feature point based on the type of the object. For example, when the object is a barcode, the object includes unique feature point information capable of identifying a form of the barcode. When the object is a QR code, the object includes unique feature point information capable of identifying a form of the QR code. As described above, when a feature point is extracted from the image of the object using image recognition technology, it is possible to verify a type of each object based on feature point information. The feature point information may be classified based on the object type using a database provided in the integrated recognition engine 160.

The integrated recognition engine 160 includes a decoder and feature point information required to recognize the object. The feature point information and the decoder are classified based on the type of the object. The feature point information is provided to the image recognition unit 140 and thereby is applied to verify the type of the object. The decoder is selectively driven based on the type of the object and thereby is applied to decode/recognize the object.

In particular, the integrated recognition engine 160 according to an exemplary embodiment of the present disclosure constructs all of the decoders based on a type of each object. Therefore, even though any object is input, integrated recognition is enabled in a single terminal.

Also, when the number of types of objects classified using the image recognition unit 140 according to an exemplary embodiment of the present disclosure is plural, for example, when all of image information and barcode information are included in the object image, the integrated recognition engine 160 may perform integrated recognition with respect to the above two objects. Also, in the above example, even though image information and barcode information may be simultaneously recognized, recognition may be performed by calling only a decoder having the most excellent recognition rate, or by sequentially calling a decoder in a descending order of a recognition rate among decoders corresponding to the type of the object for reliability of search. A ranking of a decoder with respect to a recognition rate may be based on a performance test result that is performed based on a result of completing object recognition periodically.

The control unit 130 controls the overall operation of each unit, and controls transmission and reception of data using the interface unit 110. The control unit 130 controls the object image captured using the photographing device 120 to be stored in the memory 150. Also, when performing image recognition using the image recognition unit 140, a classifier DB 162 constructed in the integrated recognition unit 160 may be provided to the image recognition unit 140.

Accordingly, the terminal 100 according to an exemplary embodiment of the present disclosure provides a convenient search service using a terminal by automatically recognizing an image of an object based on a type of the object within a device itself.

Here, even though the terminal 100 according to an exemplary embodiment of the present disclosure may create and use an object image using the photographing device 120, the present disclosure is not limited thereto and may obtain the object image using a predetermined webpage or a separate device.

Figure 3:
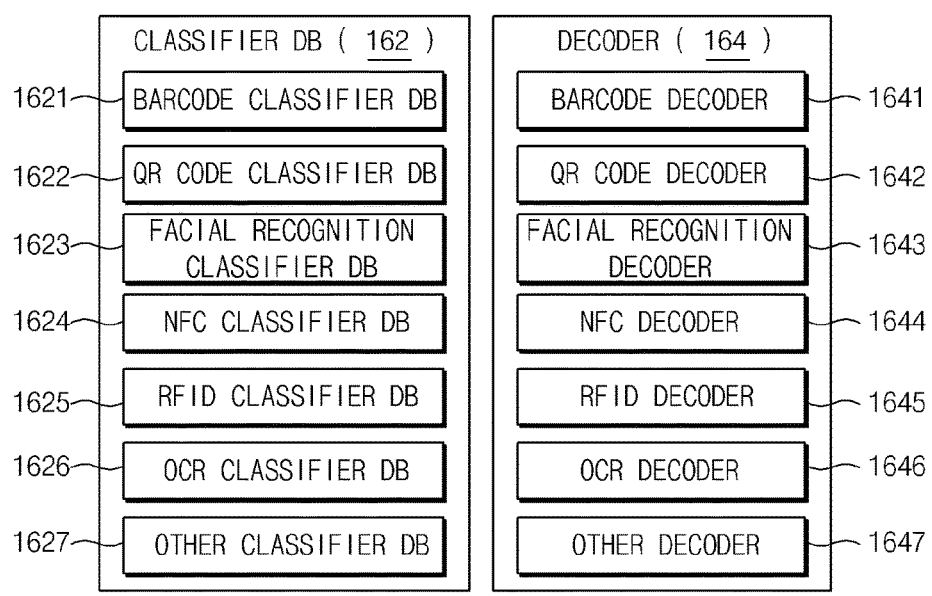
FIG. 3 is a block diagram illustrating a configuration of an integrated recognition engine of FIG. 2.

FIG. 3 is a block diagram illustrating a configuration of an integrated recognition engine according to an exemplary embodiment of the present disclosure. The integrated recognition engine 160 includes the classifier DB 162 including unique feature point information capable of identifying a type of each object, a decoder 164 for decoding each object for each type, and the like.

The classifier DB 162 may include a barcode classifier DB 1621 including unique feature point about a barcode, a QR code classifier DB 1622 including feature point information of a QR code, a facial recognition classifier DB 1623 including feature point information about a face (an eye, a nose, a mouth, and the like) for facial recognition in image recognition, an NFC classifier DB 1624 including feature point information about an NFC tag, an RFID classifier DB 1625 including feature point information about an RFID tag, an OCR classifier DB 1626 including unique feature point information about an OCR code, other classifier DB 1627 including feature point information about other codes, and the like. The unique feature point information about the barcode may use a shape including a black bar and a white bar of the barcode. The feature point information of the QR code may use a position ID code positioned at three corners. In addition, the NFC tag, the RFID tag, or the OCR code may also use a unique form.

Corresponding to a configuration of the classifier DB 162, the decoder 164 may include a barcode decoder 1641, a QR code decoder 1642, a facial recognition decoder 1643, an NFC decoder 1644, an RFID decoder 1645, an OCR decoder 1646, other decoders 1647, and the like.

Here, when a type of an object is newly added, the integrated recognition engine 160 may construct newly added feature point information and decoder to be expandable from an existing configuration.

FIG. 4 is a block diagram illustrating a configuration of an image searching apparatus according to an exemplary embodiment of the present disclosure.

Referring to FIG. 4, the image searching apparatus 300 is a configuration in a form in which the integrated recognition engine 160 of FIG. 2 to automatically recognize and thereby decode an image of an object in the terminal of FIG. 2 is constructed in an external server instead of being constructed in the terminal. In this case, the image searching apparatus 300 may provide an integrated recognition service using an integrated recognition engine 350 to the terminal over a communication network including a Wi-Fi wireless network or a mobile communication network.

For the above operation, the image searching apparatus 300 includes an interface module 310, an image recognition module 320, a control module 330, an additional information managing module 340, and the integrated recognition engine 350.

Similar to the interface unit 110 of FIG. 1 of the terminal, the interface module 310 interfaces communication between the terminal connected over the communication network and an additional service apparatus.

Similar to the image recognition unit 140 of FIG. 2 of the terminal, when an object image is received from the terminal, the image recognition module 320 classifies a type of the object from the object image through image recognition based on feature point extraction.

The integrated recognition engine 350 includes a decoder and feature point information required to recognize a variety of objects. The feature point information may be provided to the image recognition module 320 and thereby be used to classify the type of the object.

The integrated recognition engine 350 decodes an object image by automatically driving an optical decoder based on the type of the object classified by the image recognition module 320, provides decoded object information to the additional information managing module 340, and thereby makes a request for searching for additional information about the object.

Here, the image searching apparatus 300 may preferentially recognize a code type having a relatively high recognition rate based on ranking information about the recognition rate with respect to a decoder 354 provided in the integrated recognition engine 350, and may perform a search.

For example, a cup attached with a trademark of a predetermined brand and a barcode includes a plurality of objects with respect to a trademark image, a cup-shaped image, and the barcode in a single object image. Here, the image searching apparatus 300 assumes that a barcode decoder has the highest recognition rate, and recognition rate ranking information of a decoder is set in an order of the cup-shaped image and the trademark image. Based on the above assumption, when a cup image is input, the image searching apparatus 300 may decode only a barcode among the plurality of objects by initially classifying an object type and calling the barcode decoder having the highest recognition rate among decoders based on the object type. The image searching apparatus 300 performs a search using read barcode information and provides the search result.

Alternatively, based on a ranking of a decoder having an excellent recognition rate, the image searching apparatus 300 may perform a search by sequentially decoding in an order of a barcode, a cup-shaped image, and a trademark image, and may provide the search result based on the recognition rate ranking.

The control module 330 controls the overall operation thereof, and the additional information managing module 340 receives, stores, and updates additional information of each object stored in the additional service apparatus 400 of FIG. 1, at predetermined intervals.

Meanwhile, configurations and functions not described in detail herein are identical to configurations and functions of the control unit 130 of FIG. 2, the image recognition unit 140 of FIG. 2, and the integrated recognition engine 160 of FIG. 2 of the terminal 100 of FIG. 2, described above with reference to FIG. 2 and thus, a repeated description will be omitted here.

As described above, according to an exemplary embodiment of the present disclosure, there may be provided a structure in which required information is called by equipping the terminal 100 that is a client area with an integrated recognition engine to classify a type of an object included in an image by recognizing the image of the object and to decode the corresponding object by driving a decoder based on the classified object type, and by transmitting recognition completed object information to a server. Alternatively, there may be provided a structure in which the search result is provided to the corresponding terminal 100 by equipping the image searching apparatus 300 with the integrated recognition engine and by analyzing the image of the object input from the terminal 100, in real time. Regardless of the above structure, in the case of a plurality of objects, the search result using an image search may decode an object based on an excellent ranking order of a recognition rate for reliability.

Hereinafter, a service process using an integrated image searching system based on the above configuration will be described with reference to FIGS. 5 and 6.

FIG. 5 is a flowchart illustrating a search process of a terminal when an integrated recognition engine according to an exemplary embodiment of the present disclosure is equipped in the terminal. For reference, the search process will be described in association with constituent elements of FIG. 2.

The terminal 100 executes a code recognition service and captures an object using the photographing device 120 (S10).

The terminal 100 analyzes a characteristic of an image of the captured object, such as a data type, a color, a predetermined pattern, and the like with respect to an object image based on data stored in an internal classifier DB (S20).

An analysis method may apply image recognition technology based on feature point extraction of extracting a feature point from the object image, image recognition technology based on a color, and the like. For example, an image of a barcode may recognize that the object is in a barcode form through image recognition based on the feature point, and a color code may recognize a code based on the feature point and the color.

The terminal 100 classifies a type of the object through the above analysis process (S30).

To decode the classified object, the terminal 100 calls a decoder corresponding to the object type and thereby makes a request for driving the decoder (S40). That is, the terminal 100 may call and drive a barcode decoder for decoding a barcode when the barcode is detected from the image of the object, and may call and drive a facial recognition decoder for recognizing a face when feature point information about the face is detected.

Here, the terminal 100 manages decoder information having an excellent recognition rate ranking with respect to a decoder constructed in the integrated recognition engine 160. Therefore, when a plurality of objects is included in the object image, the terminal 100 may control recognition to be sequentially performed by initially calling a decoder having a relatively high ranking recognition rate, or may control recognition to be performed by recommending an object type having the highest ranking recognition rate and calling only a decoder corresponding to the recommended object type.

Next, the terminal 100 analyzes and identifies the object using the corresponding decoder (S50).

Next, the terminal 100 transmits identified object information to the image searching apparatus, makes a request for searching for additional information, and in response thereto, receives additional information about the object from the image searching apparatus and displays the received additional information (S60).

FIG. 6 is a flowchart illustrating search process between an image searching apparatus and a terminal when an integrated recognition engine according to an exemplary embodiment of the present disclosure is equipped in the image searching apparatus connected to a communication network. For reference, an operation process of FIG. 6 will be described in association with constituent elements of the image searching apparatus of FIG. 4.

The terminal 100 captures an object using a photographing device, and transmits an image of the captured object to the image searching apparatus 300 (S110 and S120).

The image searching apparatus 300 analyzes a characteristic such as a data type, a color, a feature pattern, and the like with respect to the image of the object that is transmitted from the terminal 100, using the image recognition module 352 (S130).

After analysis, the image searching apparatus 300 classifies a type of the object based on the characteristic, and calls and thereby automatically drives a decoder corresponding to the object type in order to decode the classified object (S140 and S150). The image searching apparatus 300 decodes and thereby identifies the object using the driven decoder (S160).

During the above code recognition process, the image searching apparatus 300 includes decoder information having an excellent recognition rate ranking with respect to a decoder constructed in the integrated recognition engine 350. Therefore, when an image including a plurality of objects is input, the image searching apparatus 300 may call a decoder corresponding to a corresponding object type by sequentially performing recognition starting with an object type having a relatively high recognition rate, or by recommending an object type having the highest recognition rate.

Also, the image searching apparatus 300 searches for additional information about the identified object using object information, and transmits the search result to the corresponding terminal 100 (S170 and S180).

The corresponding terminal 100 receives and thereby displays the search result, that is, additional information about the object that is transmitted from the image searching apparatus 300 (S190).

Through the above search process, the present disclosure may be employed for a price comparison service in an Internet shopping mall. In this case, only if a user has an image of an object, the user may use a shopping purchase service through price comparison of a product as well as the product.

Also, the present disclosure may be employed for a vision associated with pattern recognition, graphics technology, network technology, DB construction technology, and the like.

As described above, although certain exemplary embodiments of the present disclosure have been described in detail, it is to be understood by those skilled in the art that the spirit and scope of the present disclosure are not limited to the certain exemplary embodiments, but are intended to cover various modifications and changes without departing from the subject matter of the present disclosure. Accordingly, the present disclosure may be employed to a wide range of technical field, such as a vision associated with pattern recognition, graphics technology, network technology, DB construction technology, and the like. Accordingly, the exemplary embodiments disclosed in the specification of the present disclosure do not limit the present disclosure in any way. The scope of the present disclosure is to be defined by the scope of the appended claims below, and all technology that lies within a similar scope shall be construed as falling within the scope of the present disclosure.

INDUSTRIAL APPLICABILITY

In a search service using an image according to the related art, recognition engines for a barcode, a quick response (QR) code, facial recognition, image recognition, and the like are individually equipped in each terminal and thus, each terminal required for object recognition is individually required and a user needs to make a direct request for object recognition based on an object type. However, according to the present disclosure, when an image of an object is input, integrated recognition with respect to a variety of objects is enabled by verifying a type of the object through image recognition, selecting and applying a decoder based on the verified object type and thereby decoding the corresponding object. In addition, by verifying the type of the object prior to object recognition, automatic recognition and search is enabled without a need for a user to make a direct request for object recognition. Accordingly, when applying technology included in the present disclosure to a price comparison service, a shopping purchase service, and the like at an online shopping mall, it is possible to further activate current image search service business.

The invention claimed is:

1. A terminal for an integrated image search, comprising:
a photographing device configured to create an object image by capturing a desired object;
an image recognition unit configured to classify an object type of an object depicted in the object image;
an integrated decoder circuitry comprising a plurality of decoders, each decoder corresponding to a different object type;
wherein when the image recognition unit classifies the object into a single classified object type, the integrated decoder circuitry is configured to:
 select, from the plurality of decoders, a decoder corresponding to the single classified object type;
 drive the selected decoder corresponding to the single classified object type, and
 identify the object by decoding the object image using the selected decoder corresponding to the single classified object type;
wherein when the image recognition unit classifies the object into a plurality of classified object types, the integrated decoder circuitry is configured to:
 rank each decoder corresponding to the plurality of classified object types into a ranked order based on a determined recognition rate between the object and each of the plurality of classified object types; and
 sequentially drive each decoder corresponding to the plurality of classified object types in the ranked order, starting with the decoder having a highest recognition rate among the decoders corresponding to the classified object types.

2. An image searching apparatus comprising:
an image recognition module configured to classify an object type of an object depicted in an object image when the object image is received;
an integrated decoder circuitry comprising a plurality of decoders, each decoder corresponding to a different object type;
wherein when the image recognition module classifies the object into a single classified object type, the integrated decoder circuitry is configured to:
 select, from the plurality of decoders, a decoder corresponding to the single classified object type;
 drive the selected decoder corresponding to the single classified object type of the object, and
 identify the object by decoding the object image using the selected decoder corresponding to the single classified object type; and
wherein when the image recognition module classifies the object into a plurality of classified object types, the integrated decoder circuitry is configured to:
 rank each decoder corresponding to the plurality of classified object types into a ranked order based on a determined recognition rate between the object and each of the plurality of classified object types; and
 sequentially drive each decoder corresponding to the plurality of classified object types in the ranked order, starting with the decoder having a highest recognition rate among the decoders corresponding to the classified object types.

3. A search service method of a client terminal, the method comprising:
creating an object image by capturing a desired object;
classifying an object depicted in the object image into at least one object type from a plurality of object types;
wherein when the object is classified into a single classified object type:
 selecting, from a plurality of decoders, a decoder corresponding to the single classified object type;
 driving the selected decoder corresponding to the single classified object type; and
identifying the object by decoding the object image using the selected decoder corresponding to the classified object type; and
wherein when the object is classified into a plurality of classified object types, the driving comprises:
 ranking each decoder corresponding to the plurality of classified object types into a ranked order based on a determined recognition rate between the object and each of the plurality of classified object types; and
 sequentially driving each decoder corresponding to the plurality of classified object types in the ranked order, starting with the decoder having a highest recognition rate among the decoders corresponding to the classified object types.

4. The terminal of claim 1, wherein the plurality of decoders includes at least two of a quick response (QR) decoder, a near field communication (NFC) decoder, a radio frequency identification (RFID) decoder, an optical character recognition (OCR) decoder, a facial recognition decoder, or an image recognition decoder.

5. The image searching apparatus of claim 2, wherein the plurality of decoders includes at least two of a quick response (QR) decoder, a near field communication (NFC) decoder, a radio frequency identification (RFID) decoder, an optical character recognition (OCR) decoder, a facial recognition decoder, or an image recognition decoder.

6. The search service method of claim 3, wherein the plurality of object types includes at least two of a quick response (QR) code, a near field communication (NFC) tag, a radio frequency identification (RFID) tag, a barcode, or a facial image.

* * * * *